June 2, 1925. 1,540,476
P. M. HOFFMAN ET AL
LAMP
Filed March 12, 1923 2 Sheets-Sheet 1
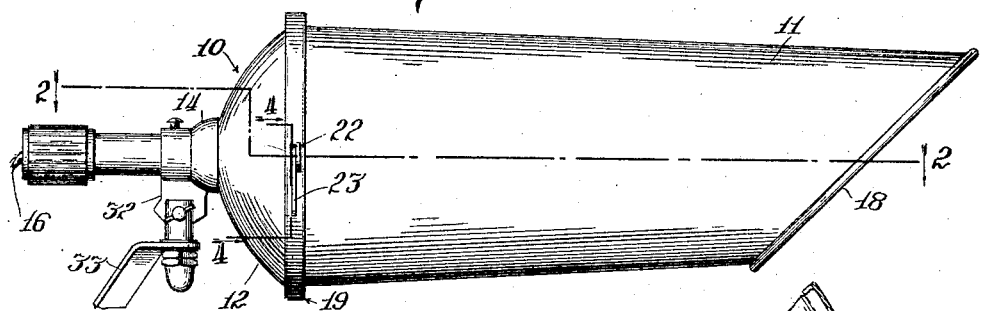
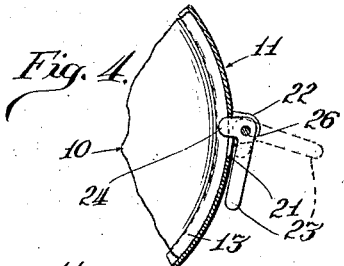
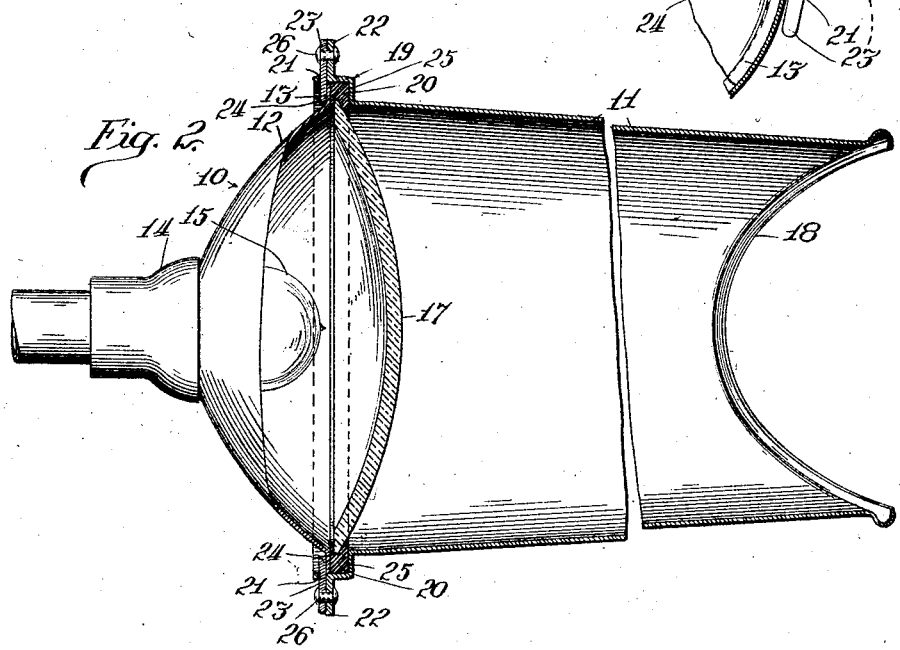
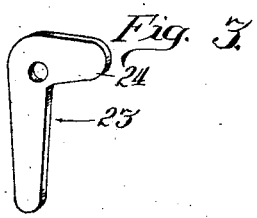

June 2, 1925.  1,540,476
P. M. HOFFMAN ET AL
LAMP
Filed March 12, 1923  2 Sheets-Sheet 2
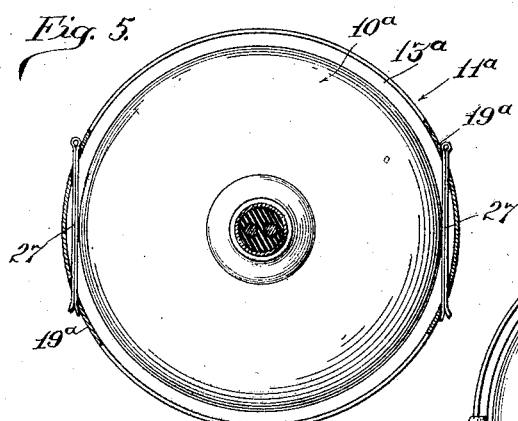
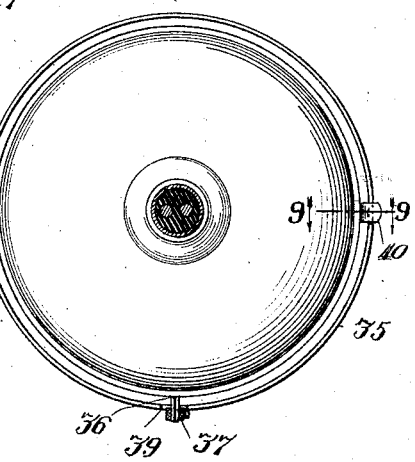
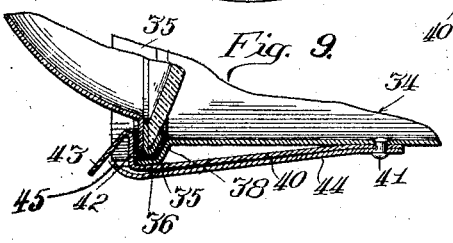
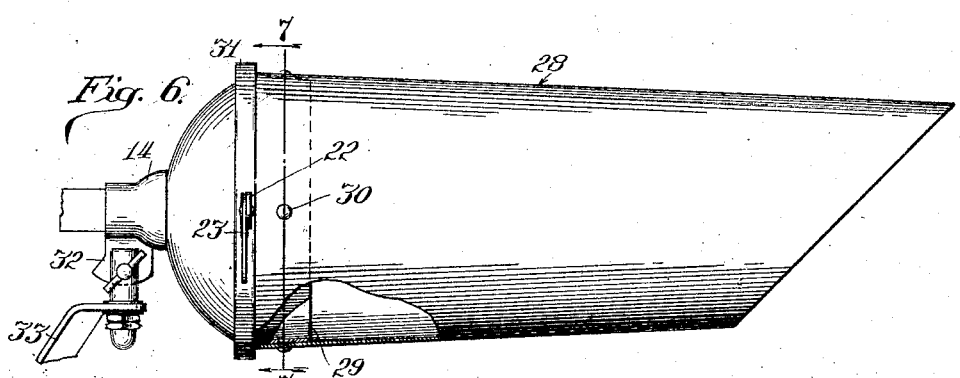
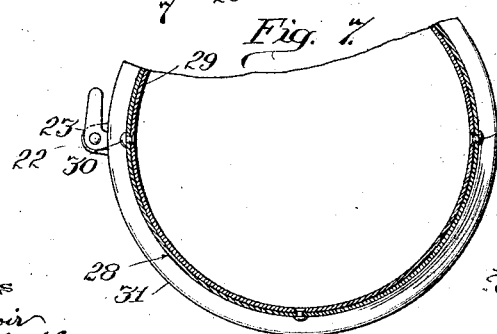

UNITED STATES PATENT OFFICE.

PETER M. HOFFMAN, OF DES PLAINES, AND CHARLES DOERING AND HENRY H. DOERING, OF CHICAGO, ILLINOIS, ASSIGNORS TO DOERING MANUFACTURING COMPANY, OF CHICAGO, ILLINOIS, A CORPORATION OF ILLINOIS.

LAMP.

Application filed March 12, 1923. Serial No. 624,331.

*To all whom it may concern:*

Be it known that we, PETER M. HOFFMAN, a citizen of the United States, and resident of Des Plaines, county of Cook, and State of Illinois, CHARLES DOERING and HENRY H. DOERING, citizens of the United States, and residents of Chicago, county of Cook, and State of Illinois, have invented certain new and useful Improvements in Lamps, of which the following is a specification.

Our invention relates to lamps for motor driven vehicles and more particularly to what are known as "spot lights" which are usually adjustably secured to the frame of the wind-shield or at any other suitable place on the automobile or vehicle.

The invention has for its object the provision of a lamp capable of suitably lighting the roadway for a considerable distance forward of the vehicle, without, however, interfering with the vision of pedestrians or the drivers of approaching vehicles; that is to say, with our improved lamp the rays of light will be so directed as not to in any way confuse or blind an approaching driver or pedestrian.

Another object of our invention is to provide a deflecting unit or shield of particular construction which may be readily applied to the well known type of lamp unit generally known as a "spot light" without necessitating changes in the lamp unit and its attaching means or bracket.

A further object of the invention is to provide a construction which may be easily put into place and readily removed when access to the lamp unit or lamp-bulb is desired for cleaning, replacement or repair.

A still further object of the invention is the provision of a construction whereby a translucent shield or deflector unit may be employed and readily applied to the lamp unit, with which the light rays will be directed in a defined manner for a great distance forward, while at the same time affording a diffused, soft light within the car sufficient to properly light the instrument board and assist the driver in seeing the foot-board and various operating mechanisms or elements under his control.

The above enumerated objects and advantages, as well as other advantages inherent in the invention, will all be more readily comprehended from the following detailed description of the accompanying drawings, wherein:—

Figure 1 is a side elevation of our improved lamp.

Figure 2 is a longitudinal, partial sectional view, with portions broken away and taken on the line 2—2 of Figure 1.

Figure 3 is a detail perspective view of one of the shield-clamping elements employed in the construction shown in Figure 1.

Figure 4 is a detail sectional view taken on the line 4—4 of Figure 1 looking in the direction of the arrows.

Figure 5 is a vertical sectional view, illustrating a modified form of shield-clamping or fastening means.

Figure 6 is a side elevation, partially broken away and in section, of a modified form.

Figure 7 is a vertical sectional view taken on the line 7—7 of Figure 6 looking in the direction of the arrows, with a portion broken away.

Figure 8 is a rear end elevation illustrating another modified form of our invention.

Figure 9 is a detail sectional view taken on the line 9—9 of Figure 8 looking in the direction of the arrows.

In the exemplification of the invention, as disclosed in Figures 1 to 4, inclusive, our improved lamp consists of the lamp or bulb unit shown at 10 and the deflector or shield unit shown at 11. The lamp or bulb unit 10 comprises the reflector shell 12, which is usually provided with an outwardly turned edge or flange 13, while the center is provided with a socket member 14, secured in an opening in the shell, to receive the lamp-bulb 15; the socket or connection member 14 also receiving the usual conductor wires or cable, a portion whereof is shown at 16 in Figure 1.

The flange or rim 13 is adapted to provide a seat for the ground or flat edge of the lens 17; the latter being mounted in and carried by the deflector or shield unit 11.

The shield unit is tubular or cylindrical in form and preferably made to taper slightly toward the forward end thereof and sheared or beveled rearwardly downward at the front as shown at 18, with the upper portion of the tubular shield or casing extending slightly beyond the lower portion, thus providing a greater or longer deflecting surface or shield at the top.

The enlarged rear end of the shield 11 is provided with a right-angular rim or enlarged annular recessed portion 19 which is adapted to receive and provide a seat for the lens 17; the periphery of the latter being preferably provided with a suitable gasket or rubber ring 20 to be disposed between the lens and the metallic surfaces of the reflector 12 and the shield 11.

The flanged or enlarged annular recessed portion 19 of the shield 11 and preferably at diametrically opposite points, is provided with slots or openings 21, 21, and with lobes or ears 22, 22, adjacent to said openings. These lobes or ears 22, 22 each has a bell-crank latch member 23 pivoted thereto; the latch members being pivoted at the angle or intermediate portion so as to permit the short arms 24 of the latch members to pass through the slots or openings 21 in the shouldered flange 19 of the shield 11; while the finger grasping portion or long arm of each latch member is disposed substantially vertically adjacent to the shield unit 11, when said members are in latching position.

The depth of the flange 19 is sufficient to receive the flanged edge of the reflector 12 and the edge of the lens with its cushioning element or gasket 20 forward of the latch members when the parts are in assembled relation; that is to say, the rim 13 of the reflector 12, the rim of the lens 17 with its surrounding gasket 20 is intended to extend between the short arms 24 of the latch members 23 and the shoulder 25 formed by the angular flange 19 when the levers 23 have been swung into locking or holding position as shown in full lines in Figures 2 and 4; the unlatching position of the levers being shown in dotted lines at the right in Figure 4.

The gasket 20 is preferably of sufficient thickness to cause the various elements to be firmly gripped or held between the shoulder portion 25 and the inwardly disposed short arms 24 of the latch levers 23 which latter are provided with pivots 26 of such construction as to frictionally hold the levers in the adjusted positions.

In Figure 5 we disclose a modified form of locking means for securing the lamp unit and the shield unit together, consisting of the pins 27, 27 preferably in the nature of cotter-pins, which are adapted to pass through aligned openings in the flange or shouldered rim 19$^a$ of the shield 11$^a$. The openings of each pair are spaced apart at a point in the flange or rim 19$^a$ where they will permit the pins 27, 27 to pass rearward of the flanged rim 13$^a$ of the reflector shell of the lamp-unit 10$^a$.

In Figures 6 and 7, we show another modification of the invention, which consists in forming the shield 28 of suitable translucent material, such as celluloid of a proper gauge or thickness bent into tubular form similar to the metallic tubular shield 11 disclosed in the previous figures. In order that the celluloid shield may be held in proper shape and permit it to be removably secured to the lamp unit, like the shield unit in the previously described constructions, we provide a metallic ring or band 29 to which the celluloid shield 28 is suitably secured as for example by means of rivets 30. The ring or band 29 is adapted to fit within the celluloid shield to reenforce the latter, while the outer edge of the band is flanged outwardly and shouldered in a manner similar to that of the metallic shield shown in Figure 2; the shouldered flange 31 being adapted to receive the rim or flanged portion of the lamp-shell or reflector 12.

The shouldered flange 31 of the band or ring 29 at diametrically opposite points is shown provided with ears or lobes 22 adjacent to suitable openings or slots in the flange 31; and the lobes provided with the clamping levers 23 pivotally secured thereto, as in the construction shown in Figures 1 to 4, so that a proper positioning of the levers will cause the short arms 24 thereof to pass through the slots in the flange 31 and engage rearward of the rim of the reflector 12 of the lamp unit and thereby firmly clamp the lamp unit and shield unit together. The band or ring 29 is intended to receive the lens 17 intermediate of the rim of the reflector and the shoulder of the ring or band 29 in a manner similar to that disclosed in Figure 2. Instead of employing the clamping levers described, it is apparent that the fastening means shown in Figure 5 may be employed.

With the constructions shown in Figures 1 and 6, it will be seen that the shield unit carries the lens, so that when the clamping elements, whether of the type shown in Figure 4 or the type shown in Figure 5, are moved into non-clamping position, the shield unit with the lens may be quickly and easily removed from the lamp unit and thus permit access to the lamp-bulb.

The socket or connection member 14 is shown provided with an extension or lobe 32 to which a suitable attaching bracket is pivotally secured, a portion of which is shown at 33.

With our improved lamp, the tubular shield unit, whether of the all metal construction shown in Figure 1 or of the translucent material or celluloid construction shown in Figure 6, enables a larger lamp-unit to be employed, by reason of the enlarged rear end of the tubular shield, and which is removably secured to the enlarged end of the shield unit.

Furthermore, with the elongated tubular shield unit the flaring or spreading of the light rays at the lens of the lamp immediately forward of the reflector, will be prevented, with the result that upon proper adjustment or positioning of the lamp, the lamp-bulb and reflector are practically hidden from the eye of the driver of an approaching vehicle and the glare or blinding effect encountered with the usual spot or search-lights, will be eliminated.

Moreover, the constructions will cause the rays of light to be thrown in a given direction and therefore concentrated on the place or in the direction desired by the operator, with the result that an effective lighting to a much greater distance is obtained than has heretofore been the case and therefore greater safety in driving may be had.

Our improved lamp, whereby the light-rays are concentrated and directed through a defined path, obviates the necessity for turning off or repeatedly dimming the lights when another vehicle is approaching; an operation involving the element of danger because of insufficient or no illumination of the roadway. Furthermore, with our improved lamp whereby glare is prevented and the light-rays directed in a defined manner, the reason for or purpose of the ordinances of many municipalities will be complied with, while at the same time obtaining the advantage of a light which may be thrown a long distance in advance of the vehicle. A lamp of the character herein described permits the driver to give his undivided attention to the operation of the vehicle.

As is readily apparent from the constructions described and disclosed in the drawings, our improved shield unit is adapted to immediate application to the present type of automobile spot-light without alteration, addition to, or change in the shell or reflector housing of the spot-light; the shield unit constituting the lens holding unit, which, however, will be so secured to the shell of the lamp-unit as to provide a dust-proof joint; while the lens, by reason of the elongated tubular shield, will be protected from snow, dirt, etc. At the same time, our improved lamp may be readily removed from its holding bracket and employed as a trouble-lamp whereby the rays of light will be thrown directly toward the place or object without shining into the face of the user.

In the modification of our invention as disclosed in Figures 8 and 9, the shield unit 34 is substantially similar in general construction to the shield unit disclosed in Figure 1 except so far as the lamp or reflecting-holding mechanism is concerned. That is to say, the shield unit 34 at the rear end is slightly enlarged and provided with the shouldered flange 35 and adapted to receive the reflector 12 with the lens 17 which latter is secured to the reflector in the usual manner by the split band or clamp ring 36 whose ends are clamped together by means of a screw and nut, as at 37, in the usual manner.

In the construction shown in Figures 8 and 9, the flanged rim of the reflector 12, with the lens 17 and clamp ring 36 is intended to take against the shoulder 38 of the shield 34; the flange 35 of the shield being slotted, as at 39 in Figure 8, for the passage of the bent ends of the clamp-ring 36 with the clamp screw and nut 37.

The shield unit 34, preferably at diametrically opposite points, is provided with spring clips or clamping members 40, 40 in the nature of flat flexible steel strips suitably secured to the sides of the shield as for example by the rivet 41, while the free end of the clip is bent inwardly at 42 to normally extend rearward of the rim of the reflector 12 and with the lens clamp ring 36. The immediate end of each clip 40 is bent outwardly to provide a finger-engaging portion 43, whereby the spring clips may be forced outwardly into releasing position. In order to ensure a firm gripping relation, the clips also comprise an auxiliary or reenforcing flat steel spring 44, one end whereof may be firmly secured in place by the same rivet 41 while the outer end is preferably bowed inwardly at 45 so as to engage with the end or the finger-engaging portion 43 of the clip members and therefore reenforce the latter and ensure the clip members remaining in firm gripping engagement with the reflector 12.

With the construction shown in Figures 8 and 9, the shield 34 may be quickly applied to the lamp unit, comprising the reflector 12 with its lens 17, by positioning the slot 39 in the flange 35 of the shield to receive the clamp-screw 37 of the split band 36 of the reflector and upon exerting outward pressure on the finger-engaging portions 43 of the clips 40 so as to permit the reflector unit to enter the flanged portion of the shield forward of the shoulders 42 of the clips. Upon releasing the finger-engaging portions, the clips will immediately spring back into place due to the resiliency of the clip proper and the reenforcing flat springs 44. This construction, like the previously described constructions, enables our improved shield unit to be readily applied to the present type of automobile spot light without necessitating alterations in the latter; while at the same time the shield unit will be firmly clamped in place against vibration or accidental removal.

We have illustrated what we believe to be the simplest and best embodiments of our invention which have been described in terms employed merely as terms of description and not as terms of limitation, as structural modifications are possible and may be made without, however, departing from the spirit of our invention.

What we claim is:—

1. In a lamp of the character described, a bulb-holding reflector provided with a rim or flange, a tubular shield of length greater than the diameter of said reflector and tapering toward the front, with the front end beveled rearwardly downward, the rear end of the shield being provided with an enlarged rearwardly bent flange adapted to receive the rim or flange of the reflector, a lens removably mounted in the flange of said shield, and clamping elements adapted to pass through said shield flange and engage rearward of the rim or flange of the reflector to removably clamp the shield to said reflector.

2. In a lamp of the character described, a reflector shell provided with an outwardly disposed rim or flange at the forward edge, a tubular shield tapering toward the front end and beveled rearwardly toward the bottom, the rear end of the shield being flanged outwardly and rearwardly to receive the rim or flange of the reflector shell and provide a lens-receiving portion, said flange being apertured at diametrically opposite points and provided with lobes or ears adjacent to said openings, levers pivotally mounted intermediate of their ends on said lobes or ears to permit one end of the levers to pass through said openings into holding relation with the rim or flange of the reflector shell.

3. The combination of a bulb-holding reflector shell provided with a rim or flange at the forward edge, with an elongated tubular shield tapering toward the front end and provided at its rear end with a shouldered flange adapted to receive the forward edge of the reflector shell, and means on the rear end of the shield adapted to engage rearward of the rim of the reflector shell whereby the tubular shield is removably secured to the reflector shell.

4. In a lamp of the character described, the combination of a reflector shell having a rim at the forward edge, an elongated tubular shield, the rear end whereof is enlarged and provided with a shoulder apertured at diametrically opposite points, a cushioning element seated in said end against the shoulder, a lens mounted in said enlarged end and seated against said element, and means carried by said enlarged end rearward of the lens and adapted to move through said apertures whereby the lens and the shield may be removably secured to the bulb-holding shell of the lamp.

5. In a lamp of the character described, a light-holding shell provided with a rim or flange at the forward edge, a tubular shield of translucent material and of length greater than the diameter of said shell and provided with an enlarged rearwardly disposed flange adapted to receive the rim or flange of the light-holding shell, a lens secured at the forward edge of said shell and enclosed by said tubular shield, and means adapted to engage rearward of the rim of the shell whereby the shield is removably secured to the shell.

6. In a lamp of the character described, the combination of a reflector shell provided with a rim or flange at the forward edge, a tubular shield of translucent material of greater length than the diameter of said shell, the rear end of the shield being provided with a metallic band having an outwardly and rearwardly disposed flange to constitute a lens receiving portion and to fit about the forward end of the shell, said band being apertured at diametrically opposite points, and means adapted to pass through said apertures in the band and to extend rearward of the rim of said shell, whereby the shield is removably secured to said shell.

PETER M. HOFFMAN.
CHARLES DOERING.
HENRY H. DOERING.

Witnesses:
J. H. BAUMGARTNER,
B. AMONDSEN.